(12) United States Patent
Meng et al.

(10) Patent No.: US 11,640,069 B2
(45) Date of Patent: May 2, 2023

(54) LIGHT EXTRACTION DEVICE, DETECTION DEVICE, AND METHOD FOR USING SAME

(71) Applicant: BOE TECHNOLOGY GROUP CO., LTD., Beijing (CN)

(72) Inventors: Xiandong Meng, Beijing (CN); Xianqin Meng, Beijing (CN); Wei Wang, Beijing (CN); Jifeng Tan, Beijing (CN); Qiuyu Ling, Beijing (CN); Fangzhou Wang, Beijing (CN); Jian Gao, Beijing (CN); Xiaochuan Chen, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 100 days.

(21) Appl. No.: 16/765,097

(22) PCT Filed: Oct. 24, 2019

(86) PCT No.: PCT/CN2019/113093
§ 371 (c)(1),
(2) Date: May 18, 2020

(87) PCT Pub. No.: WO2020/088345
PCT Pub. Date: May 7, 2020

(65) Prior Publication Data
US 2021/0364812 A1 Nov. 25, 2021

(30) Foreign Application Priority Data
Nov. 2, 2018 (CN) .......................... 201811301192.4

(51) Int. Cl.
*G02B 5/18* (2006.01)
*G02B 27/42* (2006.01)
(Continued)

(52) U.S. Cl.
CPC ......... *G02B 27/4233* (2013.01); *G01N 21/31* (2013.01); *G01N 21/85* (2013.01);
(Continued)

(58) Field of Classification Search
CPC .............. G02B 27/4233; G02B 6/0055; G02B 6/2931; G02B 6/29316; G02B 6/356;
(Continued)

(56) References Cited

U.S. PATENT DOCUMENTS 7,662,656 B2 * 2/2010 Ford ................. H01L 27/14627
438/57
8,395,768 B2 3/2013 Li et al.
(Continued)

FOREIGN PATENT DOCUMENTS

| CN | 103091850 | 5/2013 |
| CN | 103134587 | 6/2013 |

(Continued)

OTHER PUBLICATIONS

Zhou et al. "Symmetric color separation gratings", Proc. of SPIE, vol. 5201, pp. 174-179 (2003) (Year: 2003).*
(Continued)

*Primary Examiner* — Audrey Y Chang
(74) *Attorney, Agent, or Firm* — Leason Ellis LLP

(57) ABSTRACT

The light extraction device, the detection equipment and the operation method thereof are provided. The light extraction device includes at least one light splitting unit, each of the at least one light splitting unit includes a color separation grating, configured to separate light incident on the color separation grating into a plurality of light beams that are collimated and propagated in different directions and have different colors; a first lens, disposed corresponding to the color separation grating and configured to converge the plurality of light beams; and a first pinhole, located on a side
(Continued)

of the first lens away from the color separation grating and correspondingly arranged with the first lens. The first lens is configured to converge a light beam having a preset color in the plurality of light beams to the first pinhole and allow the light beam having the preset color to exit.

13 Claims, 5 Drawing Sheets

(51) Int. Cl.
    *G01N 21/31* (2006.01)
    *G01N 21/85* (2006.01)
    *F21V 8/00* (2006.01)

(52) U.S. Cl.
    CPC ... *G02B 6/0055* (2013.01); *G01N 2201/0634* (2013.01); *G01N 2201/0636* (2013.01)

(58) Field of Classification Search
    CPC .... G02B 6/29313; G01N 21/31; G01N 21/85; G01N 2201/0634; G01N 2201/0636; G01J 3/18; G01J 3/36; G01J 3/0208; G01J 3/502; G01J 3/1838; G01J 3/2823
    USPC .......................................................... 356/328
    See application file for complete search history.

(56) References Cited

U.S. PATENT DOCUMENTS

| | | | |
|---|---|---|---|
| 10,506,922 B2* | 12/2019 | Ikuta | A61B 5/0075 |
| 2009/0040580 A1 | 2/2009 | Mukawa | |
| 2009/0190072 A1* | 7/2009 | Nagata | G02B 6/005 |
| | | | 362/601 |
| 2010/0039643 A1* | 2/2010 | Park | G01J 3/18 |
| | | | 356/328 |
| 2012/0236382 A1* | 9/2012 | Puegner | G01J 3/1804 |
| | | | 359/566 |
| 2013/0114007 A1* | 5/2013 | Lin | H04N 13/31 |
| | | | 349/15 |
| 2016/0033705 A1* | 2/2016 | Fattal | G02B 5/1866 |
| | | | 349/15 |
| 2016/0209577 A1* | 7/2016 | Ford | G02F 1/133514 |
| 2016/0209633 A1 | 7/2016 | Venkatesan | |
| 2018/0172517 A1* | 6/2018 | Grueger | G01J 3/0218 |
| 2019/0212492 A1 | 7/2019 | Meng et al. | |
| 2020/0108387 A1 | 4/2020 | Dong et al. | |
| 2020/0132907 A1 | 4/2020 | Tan | |

FOREIGN PATENT DOCUMENTS

| | | |
|---|---|---|
| CN | 105492955 | 4/2016 |
| CN | 105510243 | 4/2016 |
| CN | 104515597 | 8/2016 |
| CN | 107607475 | 1/2018 |
| CN | 107966749 | 4/2018 |
| CN | 108089253 | 5/2018 |
| CN | 108562965 | 9/2018 |
| CN | 109238979 | 1/2019 |
| EP | 2770310 | 8/2014 |
| JP | 2011203701 | 10/2011 |
| WO | 2020019812 | 1/2020 |

OTHER PUBLICATIONS

Chinese Office Action dated Apr. 23, 2020 corresponding to Chinese Patent Application No. 201811301192.4; 9 pages.

* cited by examiner

LIGHT EXTRACTION DEVICE, DETECTION DEVICE, AND METHOD FOR USING SAME

CROSS-REFERENCE TO RELATED PATENT APPLICATIONS

This application is a U.S. National Stage Application under 35 U.S.C. § 371 of International Patent Application No. PCT/CN2019/113093, filed Oct. 24, 2019, which claims priority of the Chinese patent application No. 201811301192.4, filed on Nov. 2, 2018, both of which are incorporated herein by reference as part of the present application in their entireties. The International Application was published on May, 7, 2020, as International Publication No. WO 2020/088345 A1.

TECHNICAL FIELD

The present disclosure relates to a light extraction device, a detection equipment and an operation method thereof.

BACKGROUND

A light extraction device (also known as a color separation device or a light splitting device) is a scientific instrument that decomposes light with complex components into light with multiple single wavelengths. For example, general white light can be decomposed into seven colors of light. Light extraction device can be used as an analytical instrument, has a wide range of applications, and is one of the most important detection methods especially in physical, chemical and biological research.

SUMMARY

At least one embodiment of the present disclosure provides a light extraction device, which includes at least one light splitting unit, each of the at least one light splitting unit including a color separation grating, configured to separate light incident on the color separation grating into a plurality of light beams that are collimated and propagated in different directions and have different colors; a first lens, disposed corresponding to the color separation grating and configured to converge the plurality of light beams; and a first pinhole, located on a side of the first lens away from the color separation grating and disposed corresponding to the first lens. The first lens is configured to converge a light beam having a preset color in the plurality of light beams to the first pinhole and allow the light beam having the preset color to exit.

For example, in the light extraction device provided by an embodiment of the present disclosure, in each of the at least one light splitting unit, the first pinhole is located in a focal plane of the first lens.

For example, in the light extraction device provided by an embodiment of the present disclosure, in each of the at least one light splitting unit, the first pinhole is located at a position where a focal point of the first lens is located.

For example, in the light extraction device provided by an embodiment of the present disclosure, in each of the at least one light splitting unit, a center of the color separation grating and a center of the first pinhole are both located on a main optical axis of the first lens.

For example, in the light extraction device provided by an embodiment of the present disclosure, each of the at least one light splitting unit further includes: a first absorbing layer, located on a side of the first lens away from the color separation grating and configured to absorb other light beams in the plurality of light beams except the light beam having the preset color, and the first pinhole is located in the first absorbing layer.

For example, the light extraction device provided by an embodiment of the present disclosure further includes: a light guide layer; a first filling layer, located in a surface of the light guide layer close to the first lens; and a second filling layer, located in a surface of the light guide layer away from the first lens. A refractive index of the first filling layer and a refractive index of the second filling layer are both smaller than that of the light guide layer, so that light emitted by a light source is totally reflected and transmitted in the light guide layer.

For example, in the light extraction device provided by an embodiment of the present disclosure, each of the at least one light splitting unit further includes: a light guide structure, configured to guide the light totally reflected and transmitted in the light guide layer to the color separation grating.

For example, in the light extraction device provided by an embodiment of the present disclosure, the light guide structure includes: a first light extraction structure, located on a side of the light guide layer away from the first lens; and a reflective mirror, disposed corresponding to the first light extraction structure. The color separation grating is located between the reflective mirror and the first lens, the first light extraction structure is configured to destroy a total reflection condition of the light guide layer to extract the light transmitted in the light guide layer, the first light extraction structure is located in a focal plane of the reflective mirror, and the reflective mirror is configured to convert light extracted from the first light extraction structure into parallel light and reflect the parallel light to the color separation grating.

For example, in the light extraction device provided by an embodiment of the present disclosure, the first extraction structure includes a second pinhole, and the second pinhole has a diameter less than 500 μm.

For example, in the light extraction device provided by an embodiment of the present disclosure, the light guide structure in each of the at least one light splitting unit further includes: a second extraction structure, located on a side of the light guide layer close to the first lens; and a second lens, disposed corresponding to the second light extraction structure. The second lens is located between the second extraction structure and the color separation grating, the second extraction structure is configured to destroy the total reflection condition of the light guide layer to extract the light transmitted in the light guide layer, the second light extraction structure is located in a focal plane of the second lens, and the second lens is configured to convert light extracted from the second light extraction structure into parallel light and transmit the parallel light to the color separation grating.

For example, in the light extraction device provided by an embodiment of the present disclosure, the second extraction structure includes a third pinhole, the third pinhole has a diameter less than 500 μm.

For example, the light extraction device provided by an embodiment of the present disclosure further includes: a free-form surface reflection layer, located in a surface of a side of the light guide layer, where the free-form surface reflection layer is configured to reflect light emitted from a light source located at a focal point of the free-form surface reflection layer and convert the light into parallel light, and couple the parallel light to the light guide layer, in each of the at least one light splitting unit, the color separation grating is located on a side of the light guide layer close to the first lens, and the color separation grating is configured to destroy the total reflection condition of the light guide layer to extract the light transmitted in the light guide layer.

For example, in the light extraction device provided by an embodiment of the present disclosure, the at least one light splitting unit includes a plurality of light splitting units, the plurality of light splitting units are configured to respectively allow light beams having different colors in the plurality of light beams to be exited from a corresponding first pinhole, each of the plurality of light splitting units further includes: a second absorbing layer, disposed on the same layer as the first lens and surrounding the first lens.

At least one embodiment of the present disclosure provides a detection equipment, which includes: the light extraction device as mentioned above; and at least one microfluidic channel, disposed in one-to-one correspondence with the at least one light splitting unit. Each of the at least one microfluidic channel is disposed on a side of the first pinhole away from the color separation grating in the at least one light splitting unit which is correspondingly disposed.

For example, the detection equipment provided by an embodiment of the present disclosure further includes: a photosensitive detection layer, disposed on a side of the at least one microfluidic channel away from the light extraction device, the photosensitive detection layer includes at least one photoelectric sensor disposed in one-to-one correspondence with the at least one light splitting unit.

For example, the detection equipment provided by an embodiment of the present disclosure further includes: a waste liquid poor, connected with the at least one microfluidic channel.

At least one embodiment of the present disclosure provides an operation method of a detection equipment, where the detection equipment includes: the light extraction device as mentioned above; and at least one microfluidic channel, disposed in one-to-one correspondence with the at least one light splitting unit, each of the at least one microfluidic channel is disposed on a side of the first pinhole away from the color separation grating in the at least one light splitting unit which is correspondingly disposed, the operation method includes: introducing a sample droplet into the at least one microfluidic channel; and driving the sample droplet to flow through the at least one light splitting unit.

For example, in the operation method of the detection equipment provided by an embodiment of the present disclosure, the detection equipment further includes: a photosensitive detection layer, disposed on a side of the at least one microfluidic channel away from the light extraction device, where the photosensitive detection layer includes at least one photoelectric sensor disposed in one-to-one correspondence with the at least one light splitting unit, the operation method includes: acquiring a light change information detected by the photoelectric sensor; and determining a component information of the sample droplet according to the light change information and a color of light emitted by the at least one light splitting unit corresponding to the at least one photoelectric sensor.

BRIEF DESCRIPTION OF THE DRAWINGS

In order to clearly illustrate the technical solution of embodiments of the present disclosure, the drawings of the embodiments will be briefly described in the following. It is obvious that the drawings in the description are only related to some embodiments of the present disclosure and not limited to the present disclosure.

DETAILED DESCRIPTION

In order to make objects, technical details and advantages of the embodiments of the present disclosure apparent, the technical solutions of the embodiment will be described in a clearly and fully understandable way in connection with the drawings related to the embodiments of the present disclosure. It is obvious that the described embodiments are just a part but not all of the embodiments of the present disclosure. Based on the described embodiments herein, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. The terms "connected," "connection," etc., which are used in the present disclosure, are not limited to physical or mechanical connections, but may include electrical connections, whether direct or indirect.

With the development of economy and society, people are demanding more and more portable and fast detection equipment. Detection equipment with portable and fast detection characters has gradually become the research focus of major manufacturers.

Figure 1:
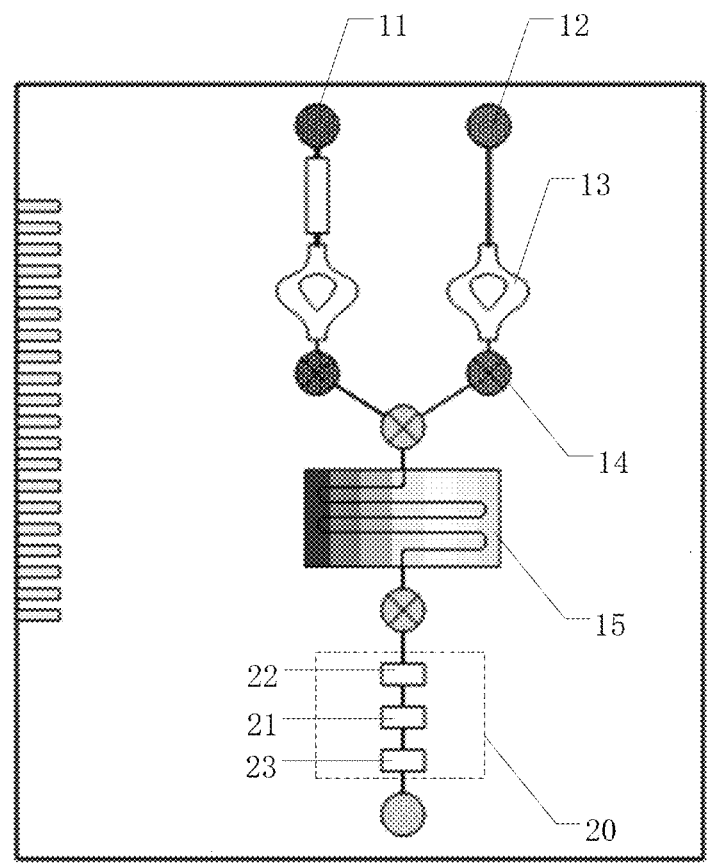
FIG. 1 is a view of a microfluidic system.

FIG. 1 is a view of a microfluidic system. As illustrated in FIG. 1, the microfluidic system includes a sample inlet 11, a reactant inlet 12, a microfluidic pump 13, a valve 14, a reaction chamber 15, and a detection unit 20. A liquid sample can be placed through the sample inlet 11, and a reactant can be placed through the reactant inlet 12; the liquid sample and the reactant can be respectively driven into the reaction chamber 15 by the microfluidic pump 13 for reaction, such as a PCR (Polymerase Chain Reaction) amplification reaction. The sample after the reaction can enter the detection unit 20 for detection. The detection unit 20 can include a working electrode 21, a reaction electrode 22 and a reference electrode 23. The microfluidic system does not detect a position, shape, flow rate, contact angle and other parameters of the liquid sample. Thus, a detection accuracy of the microfluidic system cannot meet the growing needs. In addition, the detection unit of the microfluidic system needs to convert chemical signals or biological signals into electrical signals through electrodes such as the working electrode, the reaction electrode, the reference electrode and the like in the detection unit to perform detection, so that the detection efficiency and the cost of the microfluidic system are higher.

On the other hand, because each atom has its own characteristic spectral line, substances can be identified and their chemical composition can be determined according to the spectrum. The spectral detection method has higher sensitivity and detection speed. Because liquid samples have different reactions to light with different wavelengths (different colors), they can be detected and identified by photosensitive detectors. Thus, an inventor of the present application thought that a microfluidic system can use the spectral detection method to improve the detection efficiency and accuracy, and reduce the detection cost.

A light splitting device can separate multi-color light into a plurality of monochromatic light, thereby being applicable to spectrum detection. However, a common light splitting device needs a series of optical elements to realize the color separation of the multi-color light into a plurality of monochromatic light, therefore, the common light splitting device is large in volume, unfavorable for carrying, high in cost and unfavorable for popularization and use.

Embodiments of the present disclosure provide a light extraction device and a detection equipment. The light extraction device includes at least one light splitting unit, each of the at least one light splitting unit includes a color separation grating, configured to separate light incident on the color separation grating into a plurality of light beams that are collimated and propagated in different directions and have different colors; a first lens, disposed corresponding to the color separation grating and configured to converge the plurality of light beams; and a first pinhole, located on a side of the first lens away from the color separation grating and correspondingly arranged with the first lens. The first lens is configured to converge a light beam having a preset color in the plurality of light beams to the first pinhole and allow the light beam having the preset color to exit. The light extraction device can separate incident light into a plurality of light beams with different colors by the color separation grating, and the light beams with the preset color are converged to the first pinhole and excited from the first pinhole by the cooperation of the first lens and the first pinhole, so that the light beams with the preset color are separated from other light beams at the first pinhole, thereby realizing the light extraction device. Because sizes of the color separation grating, the first lens and the first pinhole are small, the light extraction device has a small size and is convenient to carry.

The light extraction device, the detection equipment and the operation method thereof according to the embodiments of the present disclosure are described below with reference to the drawings.

Figure 2:
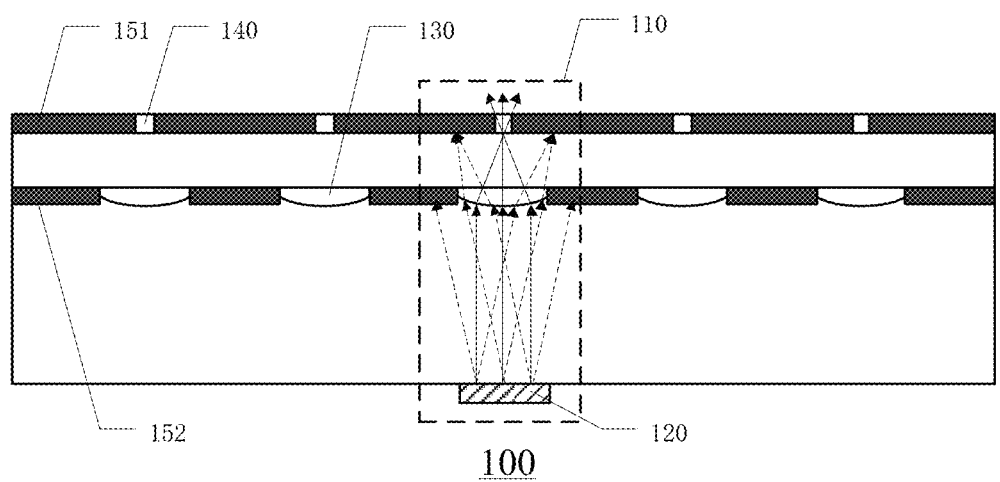
FIG. 2 is a structural view of a light extraction device provided by an embodiment of the present disclosure.

An embodiment of the present disclosure provides a light extraction device. FIG. 2 is a view of a light extraction device provided by an embodiment of the present disclosure. As illustrated in FIG. 2, the light extraction device 100 includes at least one light splitting unit 110, each light splitting unit 110 includes a color separation grating 120, a first lens 130, and a first pinhole 140. The color separation grating 120 separates light incident on the color separation grating 120 into a plurality of light beams that are collimated and propagated in different directions and have different colors; the first lens 130 is disposed corresponding to the color separation grating 120 and configured to converge the plurality of light beams; the first pinhole 140 is located on a side of the first lens 130 away from the color separation grating 120. The first pinhole 140 is disposed corresponding to the first lens 130, and the first lens 130 is configured to converge a light beam having a preset color in the plurality of light beams to the first pinhole 140 and allow the light beam having the preset color to exit. It should be noted that, in order to clearly show the specific structure of the light extraction device, FIG. 2 only shows an optical path of one light splitting unit 110. The abovementioned "converge a light beam having a preset color in the plurality of light beams to the first pinhole" means that a convergence point of the light beam with the preset color converged by the first lens 130 is located in the first pinhole 140. In this way, the light beams with the preset color can propagate out through the pinhole. However, monochromatic light beams of other wavelengths will converge outside the pinhole and cannot propagate through the first pinhole 140.

In the light extraction device provided by the embodiments of the present disclosure, the light extraction device can separate incident light into the plurality of light beams that are collimated and propagated in different directions and have different colors by the color separation grating 120. Therefore, the plurality of light beams with different colors have different incident angles respect to the first lens 130, the plurality of light beams with different colors are focused by the first lens 130, and convergent points of the plurality of light beams with different colors are arranged on a focal plane of the first lens 130 at intervals, so that the separation of the plurality of light beams with different colors in spatial positions is realized. For example, assuming that incident angles of the light beams with different colors are $\theta\lambda$, the focal length of the first lens 130 is f1, a distance $d\lambda$ from a convergent point of the light beams with different colors to the focal point of the first lens 130 satisfies $d\lambda = f1*\tan\theta\lambda$. At this time, the light beams with the preset color in the plurality of light beams can be converged to the first pinhole 140 and be excited from the first pinhole 140 by the cooperation of the first lens 130 and the first pinhole 140, so that the light beams with the preset color can be separated from other light beams at a spatial position in the first pinhole 140, and thus an accurate light extraction device can be realized with a higher signal-noise ratio. The color separation grating, the first lens and the first pinhole all have a small size, therefore, the light extraction device has a small size and is easy to carry. In addition, the color separation grating, the first lens and the first pinhole are easy to industrialize because of the lower difficulty in process manufacture.

For example, in some examples, the light beams with the preset color are not limited to light beams with a single wavelength, but also may also include a certain wavelength range. For example, upon the preset color being a wavelength range, a difference between an upper limit value and a lower limit value of the wavelength range is less than 10 nm. For example, upon the preset color being a wavelength range, a difference between an upper limit value and a lower limit value of the wavelength range is less than 5 nm.

For example, in some examples, as illustrated in FIG. 2, the light extraction device includes a plurality of light splitting units 110, the plurality of light splitting units 110 are configured to make the light beams with different wavelengths in the plurality of light beams respectively exit from corresponding first pinholes 140. For example, the plurality of light splitting units 110 arranged from left to right in FIG. 2 can respectively enable light beams with a first preset color, light beams with a second preset color, light beams with a third preset color, light beams with a fourth preset color and light beams with a fifth preset color in the plurality of light beams to be exited from corresponding first pinholes 140. It should be noted that, wavelength ranges of the light beams with the first preset color, the light beams with the second preset color, the light beams with the third preset color, the light beams with the fourth preset color and the light beams with the fifth preset color do not overlap with each other. In addition, in different light splitting units, specific parameters of color separation gratings are different.

For example, in some examples, as illustrated in FIG. 2, in each light splitting unit 110, the first pinhole 140 is located in a focal plane of the first lens 130, so that the light beams with the preset color converged by the first lens 130 can be exited from the first pinhole 140 having a small size. Therefore, the first pinhole 140 can have a small size so that crosstalk of light with other wavelengths can be prevented. For example, the first pinhole 140 has a diameter less than 500 μm.

For example, in some examples, as illustrated in FIG. 2, in each light splitting unit 110, the first pinhole 140 is located at a position where a focal point of the first lens 130 is located. Therefore, light beams perpendicular to the first lens 130 in the plurality of light beams exited from the color separation grating 120 can be exited from the first pinhole 140. The color separation grating 120 can diffract and modulate incident light incident on the color separation grating 120, and diffract and modulate the light with the preset color to realize phase matching, so that the light with the preset color is collimated and propagated in a direction perpendicular to the color separation grating 120, and light with other wavelengths is collimated and propagated in other directions. Therefore, the light extraction device can make the light exited from the color separation grating 120, and collimated and propagated in the direction perpendicular to the color separation grating 120 exit from the first pinhole 140. It should be noted that, the first pinhole 140 can be located at other positions of the focal plane of the first lens 130, and then the structure of the color separation grating can be designed so that the light beams with the preset color can be exited from the first pinhole 140. Certainly, in a case where the first pinhole is located at the position where the focal point of the first lens is located, the color separation grating is easy to design.

For example, in some examples, as illustrated in FIG. 2, in each light splitting unit 110, a center of the color separation grating 120, a center of the first lens 130 and a center of the first pinhole 140 are all located at a straight line, and the center of the color separation grating 120 and the center of the first pinhole 140 are both located on a main optical axis of the first lens 130.

For example, in some examples, as illustrated in FIG. 2, each light splitting unit 110 further includes a first absorbing layer 151 located on a side of the first lens 130 away from the color separation grating 120, the first pinhole 140 is located in the first absorbing layer 151, and penetrates the first absorbing layer 151. On one hand, the first pinhole 140 can be formed by opening the first light absorbing layer 151; on the other hand, the first absorbing layer 151 can absorb other light beams in the plurality of light beams except the light beam having the preset color, so as to reduce crosstalk of the light beams having other wavelengths and increase signal-noise ratio. For example, the first absorbing layer 151 can include a black matrix material.

For example, in some examples, as illustrated in FIG. 2, each light splitting unit 110 further includes a second absorbing layer 152 disposed on the same layer as the first lens 130 and surrounding the first lens 130. The second absorbing layer 152 disposed on the same layer as the first lens 130 can block or absorb light beams incident on other regions other than the first lens 130 to enter between the first lens 130 and the first pinhole 140, thereby further reducing crosstalk of light beams having other wavelengths and increasing signal-noise ratio. For example, the second absorbing layer 152 can include a black matrix material. Certainly, the embodiment of the present disclosure includes but is not limited thereto, a plurality of first lenses can form an array, and the absorbing layers are not disposed.

Figure 3:
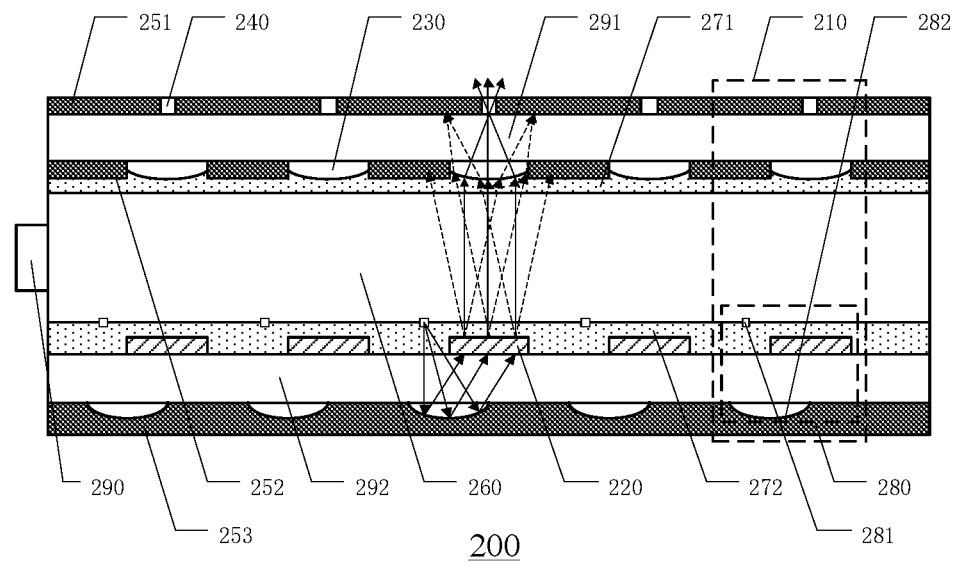
FIG. 3 is a structural view of another light extraction device provided by an embodiment of the present disclosure.

FIG. 3 is a structural view of another light extraction device provided by an embodiment of the present disclosure. As illustrated in FIG. 3, the light extraction device 200 includes at least one light splitting unit 210, each light splitting unit 210 includes a color separation grating 220, a first lens 230 and a first pinhole 240. The color separation grating 220 separates light incident on the color separation grating 220 into a plurality of light beams that are collimated and propagated in different directions and have different colors; the first lens 230 is disposed corresponding to the color separation grating 220 and configured to converge the plurality of light beams; the first pinhole 240 is located on a side of the first lens 230 away from the color separation grating 220. The first pinhole 240 is disposed corresponding to the first lens 230, and the first lens 230 is configured to converge a light beam having a preset color in the plurality of light beams to the first pinhole 240 and allow the light beam having the preset color to exit. Each light splitting unit 210 further includes a light guide layer 260, a first filling layer 271 located in a surface of the light guide layer 260 close to the first lens 230 and a second filling layer 272 located in a surface of the light guide layer 260 away from the first lens 230. A refractive index of the first filling layer 271 and a refractive index of the second filling layer 272 are both smaller than that of the light guide layer 260, so that light emitted by a light source is totally reflected and transmitted in the light guide layer 260. For example, as illustrated in FIG. 3, a light source 290 can be disposed on a surface of the light guide layer 260 so that light emitted from the light source 290 may be fed into the light guide layer 260. The light guide layer 260 may provide a light source for the light splitting unit as mentioned above. It should be noted that in order to clearly show the specific structure of the light extraction device, FIG. 3 only shows the optical path of one light splitting unit 210.

For example, in some examples, as illustrated in FIG. 3, each light splitting unit 210 further includes a light guide structure 280 configured to guide the light totally reflected and transmitted in the light guide layer 260 to the color separation grating 220.

For example, in some examples, as illustrated in FIG. 3, the light guide structure 280 includes a first light extraction structure 281 and a reflective mirror 282; the first light extraction structure 281 is located on a side of the light guide layer 260 away from the first lens 230, the reflective mirror 282 is disposed corresponding to the first light extraction structure 281, the color separation grating 281 is located between the reflective mirror 282 and the first lens 230, the first light extraction structure 281 is configured to destroy a total reflection condition of the light guide layer 260 to extract the light transmitted in the light guide layer 260, the first light extraction structure 281 located in a focal plane of the reflective mirror 282, and the reflective mirror 282 is configured to convert light extracted from the first light extraction structure 281 into parallel light and reflect the parallel light to the color separation grating 220. The light guide structure 280 can extract the light transmitted in the light guide layer 260 at a specific position and convert it into parallel light, so that the light extraction structure has no requirement on the size, alignment accuracy, and light collimation of the light source, thereby further reducing the cost of the light extraction device.

In the light extraction device of the embodiment, the light emitted from the light source 290 can be totally reflected and transmitted in the light guide layer 260, the first light extraction structure 281 can extract the light totally reflected and transmitted in the light guide layer 260, and the light extracted from the light guide layer is directed to the reflective mirror 282. The reflective mirror 282 can convert the light extracted from the first light extraction structure 281 to parallel light and reflect to the color separation grating 220, the color separation grating 220 separates the incident light into a plurality of light beams with different colors, and light beams with a preset color in the plurality of light beams can be converged to the first pinhole 240 so as to be exited by the cooperation of the first lens 230 and the first pinhole 240, thereby realizing a light extraction device for accurate color separation. Because sizes of the color separation grating, the first lens and the first pinhole are small, the light extraction device has a small size and is convenient to carry. In addition, the color separation grating, the first lens and the first pinhole are easy to industrialize because of the lower difficulty in process manufacture. Furthermore, because the light guide structure has a relatively thin thickness, the thickness of the light extraction device is relatively thin, which is favorable for light and thin design.

For example, in some examples, the first light extraction structure 281 can be a second pinhole 281, the second pinhole 281 has a diameter less than 500 μm. Upon the first light extraction structure 281 being the second pinhole 281, because the size of the second pinhole 281 in the light guide layer 260 is small, the light diffracted from the second pinhole 281 can be regarded as a spherical wave emitted by a point light source. At this time, because the second pinhole 281 is located in the focal plane of the reflective mirror 282, the spherical wave emitted by the second pinhole 281 can be converted into parallel light by the reflective mirror 282.

For example, in some examples, an orthographic projection of a center of the first light extraction structure 281 on the light guide layer 260 does not overlap with an orthographic projection of a center of the reflective mirror 282 on the light guide layer 260, and is located on a side of the orthographic projection of the center of the reflective mirror 282 on the light guide layer 260 away from an orthographic projection of a center of the color separation grating 220 on the light guide layer 260. That is, a central axis of the reflective mirror 282 is offset from the first light extraction structure 281 to facilitate the reflection of the light extracted by the first light extraction structure 281 to the color separation grating 220.

For example, in some examples, the light beams with the preset color are not limited to light beams with a single wavelength, but also may also include a certain wavelength range. For example, upon the preset color being a wavelength range, a difference between an upper limit value and a lower limit value of the wavelength range is less than 10 nm. For example, upon the preset color being a wavelength range, a difference between an upper limit value and a lower limit value of the wavelength range is less than 5 nm.

For example, in some examples, as illustrated in FIG. 3, the light extraction device includes a plurality of light splitting units 210, the plurality of light splitting units 210 are configured to make the light beams with different wave lengths in the plurality of light beams respectively exit from corresponding first pinholes 240. For example, the plurality of light splitting units 210 arranged from left to right in FIG. 3 can respectively enable light beams with a first wave length range, light beams with a second wave length range, light beams with a third wave length range, light beams with a fourth wave length range and light beams with a fifth wave length range in the plurality of light beams to be exited from corresponding first pinholes 240. It should be noted that, wavelength ranges of the first wave length range, the second wave length range, the third wave length range, the fourth wave length range and the fifth wave length range do not overlap with each other. In addition, in different light splitting units, specific parameters of color separation gratings are different.

For example, in some examples, as illustrated in FIG. 3, in each light splitting unit 210, the first pinhole 240 is located in a focal plane of the first lens 230, so that the light beams with the preset color converged by the first lens 230 can be exited from the first pinhole 240 having a small size. Therefore, the first pinhole 240 can have a small size so that crosstalk of light with other wavelengths can be prevented. For example, the first pinhole 240 has a diameter less than 500 μm.

For example, in some examples, as illustrated in FIG. 3, in each light splitting unit 210, the first pinhole 240 is located at a position where a focal point of the first lens 230 is located. Therefore, light beams perpendicular to the first lens 230 in the plurality of light beams exited from the color separation grating 220 can be exited from the first pinhole 240. The color separation grating 220 can diffract and modulate incident light incident on the color separation grating 220, and diffract and modulate the light with the preset color to realize phase matching, so that the light with the preset color is collimated and propagated in a direction perpendicular to the color separation grating 220, and light with other wavelengths is collimated and propagated in other directions. Therefore, the light extraction device can make the light exited from the color separation grating 220, and collimated and propagated in the direction perpendicular to the color separation grating 220 exit from the first pinhole 240. It should be noted that, the first pinhole 240 can be located at other positions of the focal plane of the first lens 230, and then the structure of the color separation grating can be designed so that the light beams with the preset color can be exited from the first pinhole 240. Certainly, in a case where the first pinhole is located at the position where the focal point of the first lens is located, the color separation grating is easy to design.

For example, in some examples, as illustrated in FIG. 3, in each light splitting unit 210, a center of the color separation grating 220, a center of the first lens 230 and a center of the first pinhole 240 are all located at a straight line. For example, the center of the color separation grating 220 and the center of the first pinhole 240 are both located on a main optical axis of the first lens 230.

For example, in some examples, as illustrated in FIG. 3, each light splitting unit 210 further includes a first absorbing layer 251 located on a side of the first lens 230 away from the color separation grating 220, the first pinhole 240 is located in the first absorbing layer 251. On one hand, the first pinhole 240 can be formed by opening the first light absorbing layer 251; on the other hand, the first absorbing layer 251 can absorb other light beams in the plurality of light beams except the light beam having the preset color, so as to reduce crosstalk of the light beams having other wavelengths and increase signal-noise ratio.

For example, in some examples, as illustrated in FIG. 3, each light splitting unit 210 further includes a second absorbing layer 252 disposed on the same layer as the first lens 230 and surrounding the first lens 230. The second absorbing layer 252 disposed on the same layer as the first lens 230 can absorb light beams incident on other regions other than the first lens 230 to enter between the first lens 230 and the first pinhole 240, thereby further reducing crosstalk of the light beams having other wavelengths and increasing signal-noise ratio.

For example, in some examples, as illustrated in FIG. 3, a first transparent substrate 291 can be disposed between the first pinhole 240 and the first lens 230 to serve as a medium for light beam propagation, and may also serve to fix the first pinhole 240 and the first lens 230.

For example, in some examples, as illustrated in FIG. 3, a second transparent substrate 292 can be disposed between the second filling layer 272 and the reflective mirror 282 to serve as a medium for light beam propagation.

For example, in some examples, as illustrated in FIG. 3, the color separation grating 220 is disposed on a side of the second filling layer close to the second transparent substrate 292, so as to prevent the color separation grating 220 from destroying the total reflection condition of the light guide layer 260.

For example, in some examples, as illustrated in FIG. 3, each color separation unit 210 further includes a third absorbing layer 253, disposed on the same layer as the reflective mirror 282 and surrounding the reflective mirror 282, so as to absorb part of the light extracted from the first light extraction structure 281 but not incident on the reflective mirror 282, thereby preventing the part of the light from being transmitted to a side of the first pinhole 240 away from the first lens 230 to cause crosstalk or noise.

Figure 4:
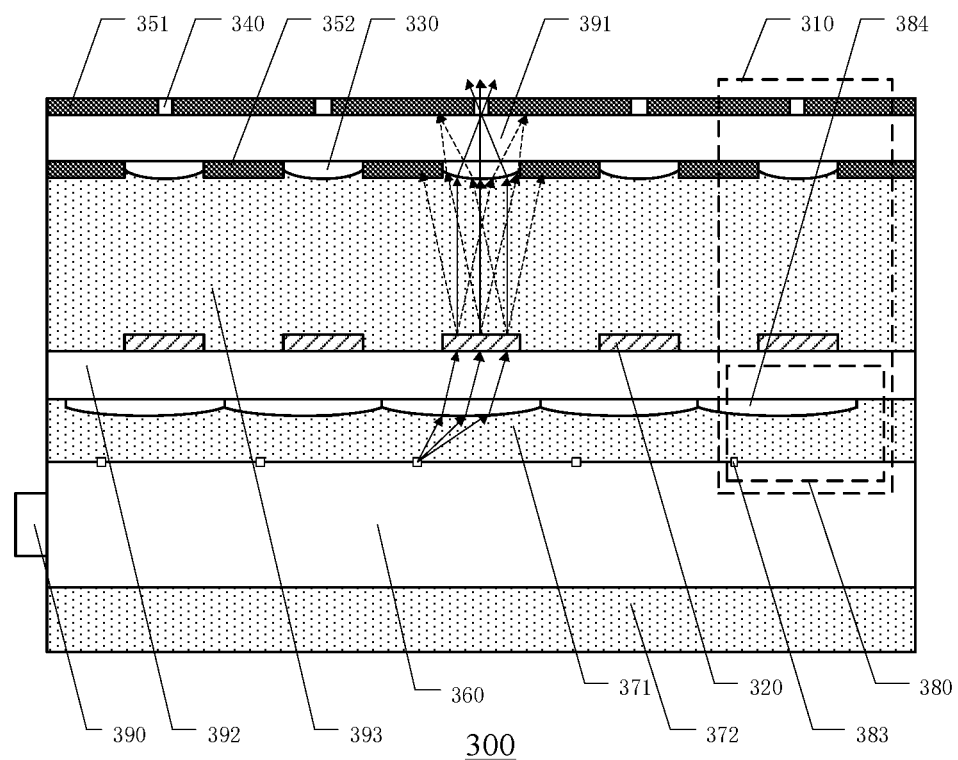
FIG. 4 is a structural view of another light extraction device provided by an embodiment of the present disclosure.

FIG. 4 is a structural view of another light extraction device provided by an embodiment of the present disclosure. As illustrated in FIG. 4, the light extraction device 300 includes at least one light splitting unit 310, each light splitting unit 310 includes a color separation grating 320, a first lens 330 and a first pinhole 340. The color separation grating 320 separates light incident on the color separation grating 320 into a plurality of light beams that are collimated and propagated in different directions and have different colors; the first lens 330 is disposed corresponding to the color separation grating 320 and configured to converge the plurality of light beams; the first pinhole 340 is located on a side of the first lens 330 away from the color separation grating 320. The first pinhole 340 is disposed corresponding to the first lens 330, and the first lens 330 is configured to converge a light beam having a preset color in the plurality of light beams to the first pinhole 340 and allow the light beam having the preset color to exit. Each light splitting unit 310 further includes a light guide layer 360, a first filling layer 371 located in a surface of the light guide layer 360 close to the first lens 330 and a second filling layer 372 located in a surface of the light guide layer 360 away from the first lens 330. A refractive index of the first filling layer 371 and a refractive index of the second filling layer 372 are both smaller than that of the light guide layer 360, so that light emitted by a light source is totally reflected and transmitted in the light guide layer 360. For example, as illustrated in FIG. 4, a light source 390 can be disposed on a surface of the light guide layer 360 so that light emitted from the light source 390 may be fed into the light guide layer 360. The light guide layer 360 may provide a light source for the light splitting unit as mentioned above.

For example, in some examples, as illustrated in FIG. 4, each light splitting unit 310 further includes a light guide structure 380 configured to guide the light totally reflected and transmitted in the light guide layer 360 to the color separation grating 320.

For example, in some examples, as illustrated in FIG. 4, the light guide structure 380 includes a second light extraction structure 383 and a second lens 384; the second extraction structure 383 is located on a side of the light guide layer 360 close to the first lens 220; the second lens 384 is disposed corresponding to the second light extraction structure 383 and located between the second extraction structure 383 and the color separation grating 320, the second extraction structure 383 is configured to destroy the total reflection condition of the light guide layer 360 to extract the light transmitted in the light guide layer 360, the second light extraction structure 383 is located in a focal plane of the second lens 384, and the second lens 384 is configured to convert light extracted from the second light extraction structure 383 into parallel light and transmit the parallel light to the color separation grating 320. The light guide structure 380 can extract the light transmitted in the light guide layer 360 at a specific position and convert it into parallel light, so that the light extraction structure has no requirement on the size, alignment accuracy, and light collimation of the light source, thereby further reducing the cost of the light extraction device.

In the light extraction device of the embodiment, the light source 390 can be disposed on a surface of the light guide layer 360, the light emitted from the light source 390 can be totally reflected and transmitted in the light guide layer 360, the second light extraction structure 383 can extract the light totally reflected and transmitted in the light guide layer 360, and the light extracted from the light guide layer is directed to the second lens 384. The second lens 384 can convert the light extracted from the second light extraction structure 383 to parallel light and transmit the parallel light to the color separation grating 320, the color separation grating 320 separates the incident light into a plurality of light beams with different colors, and light beams with a preset color in the plurality of light beams can be converged to the first pinhole 240 so as to be exited by the cooperation of the first lens 330 and the first pinhole 340, thereby realizing a light extraction device for accurate color separation. Because sizes of the color separation grating, the first lens and the first pinhole are small, the light extraction device has a small size and is convenient to carry. In addition, the color separation grating, the first lens and the first pinhole are easy to industrialize because of the lower difficulty in process manufacture. Furthermore, because the light guide structure has a relative simple structure, the manufacturing difficulty is relatively low.

For example, in some examples, the second light extraction structure 383 can be a third pinhole 383, the third pinhole 383 has a diameter less than 500 μm. Upon the second light extraction structure 383 being the third pinhole 383, because the size of the third pinhole 383 in the light guide layer 360 is small, the light diffracted from the third pinhole 383 can be regarded as a spherical wave emitted by a point light source. At this time, because the third pinhole 383 is located in the focal plane of the second lens 384, the spherical wave emitted by the third pinhole 383 can be converted into parallel light by the second lens 384.

For example, in some examples, as illustrated in FIG. 4, an orthographic projection of a center of the second light extraction structure 383 on the light guide layer 360 does not overlap with an orthographic projection of a center of the second lens 384 on the light guide layer 360, and is located on a side of the orthographic projection of the center of the second lens 384 on the light guide layer 360 away from an orthographic projection of a center of the color separation grating 320 on the light guide layer 260. That is, a central axis of the second lens 384 is offset from the second light extraction structure 383 to facilitate the transmission of the light extracted by the second light extraction structure 383 to the color separation grating 320.

For example, in some examples, the light beams with the preset color are not limited to light beams with a single wavelength, but also may also include a certain wavelength range. For example, upon the preset color being a wavelength range, a difference between an upper limit value and a lower limit value of the wavelength range is less than 10 nm. For example, upon the preset color being a wavelength range, a difference between an upper limit value and a lower limit value of the wavelength range is less than 5 nm.

For example, in some examples, as illustrated in FIG. 4, the light extraction device includes a plurality of light splitting units 310, the plurality of light splitting units 310 are configured to make the light beams with different wavelengths in the plurality of light beams respectively exit from corresponding first pinholes 340. For example, the plurality of light splitting units 310 arranged from left to right in FIG. 4 can respectively enable light beams with a first preset color, light beams with a second preset color, light beams with a third preset color, light beams with a fourth preset color and light beams with a fifth preset color in the plurality of light beams to be exited from corresponding first pinholes 340. It should be noted that, wavelength ranges of the light beams with the first preset color, the light beams with the second preset color, the light beams with the third preset color, the light beams with the fourth preset color and the light beams with the fifth preset color do not overlap with each other. In addition, in different light splitting units, specific parameters of color separation gratings are different.

For example, in some examples, as illustrated in FIG. 4, in each light splitting unit 310, the first pinhole 340 is located in a focal plane of the first lens 330, so that the light beams with the preset color converged by the first lens 330 can be exited from the first pinhole 340 having a small size. Therefore, the first pinhole 340 can have a small size so that crosstalk of light with other wavelengths can be prevented. For example, the first pinhole 340 has a diameter less than 500 μm.

For example, in some examples, as illustrated in FIG. 4, in each light splitting unit 310, the first pinhole 340 is located at a position where a focal point of the first lens 330 is located. Therefore, light beams perpendicular to the first lens 330 in the plurality of light beams exited from the color separation grating 320 can be exited from the first pinhole 340. At this time, the color separation grating 320 can diffract and modulate incident light incident on the color separation grating 320, and diffract and modulate the light with the preset color to realize phase matching, so that the light with the preset color is collimated and propagated in a direction perpendicular to the color separation grating 320, and light with other wavelengths is collimated and propagated in other directions. Therefore, the light extraction device can make the light exited from the color separation grating 320, and collimated and propagated in the direction perpendicular to the color separation grating 320 exit from the first pinhole 340. It should be noted that, the first pinhole 340 can be located at other positions of the focal plane of the first lens 330, and then the structure of the color separation grating can be designed so that the light beams with the preset color can be exited from the first pinhole 340. Certainly, in a case where the first pinhole is located at the position where the focal point of the first lens is located, the color separation grating is easy to design.

For example, in some examples, as illustrated in FIG. 4, in each light splitting unit 310, a center of the color separation grating 320, a center of the first lens 330 and a center of the first pinhole 340 are all located at a straight line. For example, the center of the color separation grating 320 and the center of the first pinhole 340 are both located on a main optical axis of the first lens 330.

For example, in some examples, as illustrated in FIG. 4, each light splitting unit 310 further includes a first absorbing layer 351 located on a side of the first lens 330 away from the color separation grating 320, the first pinhole 340 is located in the first absorbing layer 351. On one hand, the first pinhole 340 can be formed by opening the first light absorbing layer 351; on the other hand, the first absorbing layer 351 can absorb other light beams in the plurality of light beams except the light beam having the preset color, so as to reduce crosstalk of the light beams having other wavelengths and increase signal-noise ratio.

For example, in some examples, as illustrated in FIG. 4, each light splitting unit 310 further includes a second absorbing layer 352 disposed on the same layer as the first lens 330 and surrounding the first lens 330. The second absorbing layer 352 disposed on the same layer as the first lens 330 can block or absorb light beams incident on other regions other than the first lens 330 to enter between the first lens 330 and the first pinhole 340, thereby further reducing crosstalk of the light beams having other wavelengths and increasing signal-noise ratio.

For example, in some examples, as illustrated in FIG. 4, the second light extraction structure 383 is disposed on a side of the first filling layer 371 close to the light guide layer 360, and the second lens 384 is disposed on a side of the first filling layer 371 away from the light guide layer 360.

For example, in some examples, as illustrated in FIG. 4, a first transparent substrate 391 can be disposed between the first pinhole 340 and the first lens 330 to serve as a medium for light beam propagation, and may also serve to fix the first pinhole 340 and the first lens 330.

For example, in some examples, as illustrated in FIG. 4, a second transparent substrate 392 can be disposed between the second lens 384 and the color separation grating 320 to serve as a medium for light beam propagation, and may also serve to fix the second lens 384 and the color separation grating 320.

For example, in some examples, as illustrated in FIG. 4, a third transparent substrate 393 is also disposed between the color separation grating 320 and the first lens 330 to serve as a medium for light beam propagation. For example, the third transparent substrate 393 can be made of a low refractive index material.

Figure 5:
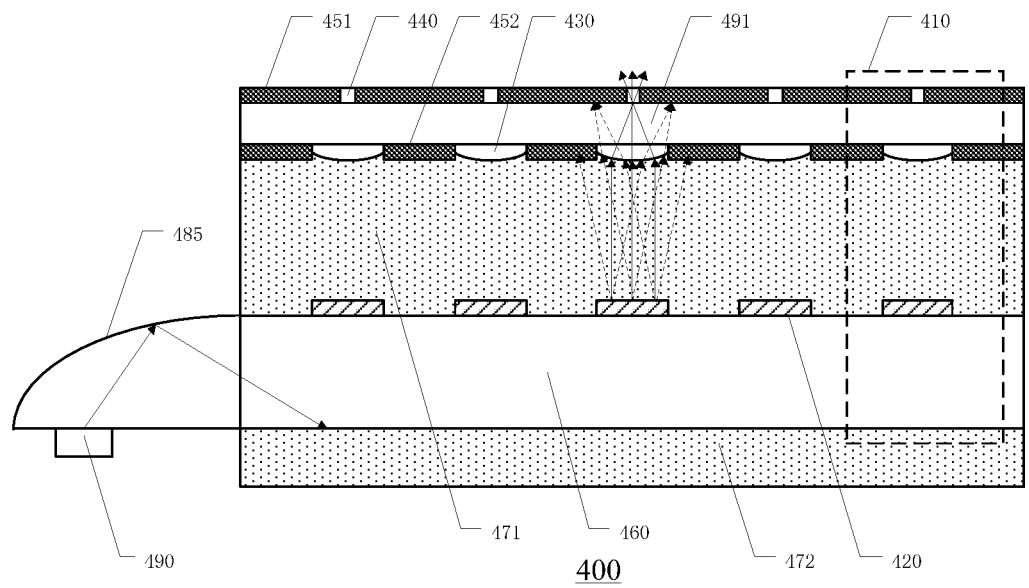
FIG. 5 is a structural view of another light extraction device provided by an embodiment of the present disclosure.

FIG. 5 is a structural view of another light extraction device provided by an embodiment of the present disclosure. As illustrated in FIG. 5, the light extraction device 400 includes at least one light splitting unit 410, each light splitting unit 410 includes a color separation grating 420, a first lens 430 and a first pinhole 440. The color separation grating 420 separates light incident on the color separation grating 420 into a plurality of light beams that are collimated and propagated in different directions and have different colors; the first lens 430 is disposed corresponding to the color separation grating 420 and configured to converge the plurality of light beams; the first pinhole 440 is located on a side of the first lens 430 away from the color separation grating 420. The first pinhole 440 is disposed corresponding to the first lens 430, and the first lens 430 is configured to converge a light beam having a preset color in the plurality of light beams to the first pinhole 440 and allow the light beam having the preset color to exit. Each light splitting unit 410 further includes a light guide layer 460, a first filling layer 471 located in a surface of the light guide layer 460 close to the first lens 430 and a second filling layer 472 located in a surface of the light guide layer 460 away from the first lens 430. A refractive index of the first filling layer 471 and a refractive index of the second filling layer 472 are both smaller than that of the light guide layer 460, so that light emitted by a light source can be totally reflected and transmitted in the light guide layer 460. For example, as illustrated in FIG. 5, the light extraction device further includes: a free-form surface reflection layer 485, located in a surface of a side of the light guide layer 260 and configured to reflect light emitted from a light source 490 located at a focal point of the free-form surface reflection layer 485 and convert the light into parallel light, and couple the parallel light to the light guide layer 460, in each light splitting unit 410, the color separation grating 420 is located on a side of the light guide layer 460 close to the first lens 430, and the color separation grating 420 is configured to destroy the total reflection condition of the light guide layer 460 to extract the light transmitted in the light guide layer 460. Because the free-form surface reflection layer 485 can convert the light emitted from the light source 490 into parallel light, the light extraction structure has no requirement on the size, alignment accuracy, and light collimation of the light source, thereby further reducing the cost of the light extraction device. It should be noted that, when the light extraction device includes a light source, the light source 490 can be disposed at a focal point of the free-form surface reflection layer 485; when the light extraction device does not include a light source, the light extraction device can include a fixing device for fixing the light source 490 at the focal point of the free-form surface reflection layer 485 so as to facilitate the installation of the light source 490 at the focal point of the free-form surface reflection layer 485.

In the light extraction device of the embodiment, the light emitted from the light source 490 can be converted into parallel light by the free-form surface reflection layer 485 and totally reflected and transmitted in the light guide layer 460, thus, the light totally reflected and transmitted in the light guide layer 460 is parallel light (collimating light). In this time, the color separation grating 420 located on a side of the light guide layer 460 close to the first lens 430 can directly destroy the total reflection condition of the light guide layer 460 so as to extract the parallel light transmitted in the light guide layer 460 and separate the parallel light into a plurality of light beams with different colors, and light beams with a preset color in the plurality of light beams can be converged to the first pinhole 440 so as to be exited by the cooperation of the first lens 430 and the first pinhole 440, thereby realizing a light extraction device for accurate color separation. Because sizes of the color separation grating, the first lens and the first pinhole are small, the light extraction device has a small size and is convenient to carry. In addition, the color separation grating, the first lens and the first pinhole are easy to industrialize because of the lower difficulty in process manufacture.

For example, in some examples, as illustrated in FIG. 5, the light extraction device includes a plurality of light splitting units 410, the plurality of light splitting units 410 are configured to make the light beams with different wave lengths in the plurality of light beams respectively exit from corresponding first pinholes 440. For example, the plurality of light splitting units 410 arranged from left to right in FIG. 5 can respectively enable light beams with a first wave length range, light beams with a second wave length range, light beams with a third wave length range, light beams with a fourth wave length range and light beams with a fifth wave length range in the plurality of light beams to be exited from corresponding first pinholes 440. It should be noted that, wavelength ranges of the first wave length range, the second wave length range, the third wave length range, the fourth wave length range and the fifth wave length range do not overlap with each other. In addition, in different light splitting units, specific parameters of color separation gratings are different.

For example, in some examples, as illustrated in FIG. 5, in each light splitting unit 410, the first pinhole 440 is located in a focal plane of the first lens 430, so that the light beams with the preset color converged by the first lens 430 can be exited from the first pinhole 440 having a small size. Furthermore, because the first pinhole 240 can have a small size, crosstalk of light with other wavelengths can be prevented. For example, the first pinhole 440 has a diameter less than 500 μm.

For example, in some examples, as illustrated in FIG. 5, in each light splitting unit 410, the first pinhole 440 is located at a position where a focal point of the first lens 430 is located. Therefore, light beams perpendicular to the first lens 430 in the plurality of light beams exited from the color separation grating 420 can be exited from the first pinhole 440. At this time, the color separation grating 420 can diffract and modulate incident light incident on the color separation grating 420, and diffract and modulate the light with the preset color to realize phase matching, so that the light with the preset color is collimated and propagated in a direction perpendicular to the color separation grating 420, and light with other wavelengths is collimated and propagated in other directions. Therefore, the light extraction device can make the light exited from the color separation grating 420, and collimated and propagated in the direction perpendicular to the color separation grating 420 exit from the first pinhole 440. It should be noted that, the first pinhole 440 can be located at other positions of the focal plane of the first lens 430, and then the structure of the color separation grating can be designed so that the light beams with the preset color can be exited from the first pinhole 440. Certainly, in a case where the first pinhole is located at the position where the focal point of the first lens is located, the color separation grating is easy to design.

For example, in some examples, as illustrated in FIG. 5, in each light splitting unit 410, a center of the color separation grating 420, a center of the first lens 430 and a center of the first pinhole 440 are all located at a straight line. For example, the center of the color separation grating 420 and the center of the first pinhole 440 are both located on a main optical axis of the first lens 430.

For example, in some examples, as illustrated in FIG. 5, each light splitting unit 410 further includes a first absorbing layer 451 located on a side of the first lens 430 away from the color separation grating 420, the first pinhole 440 is located in the first absorbing layer 451. On one hand, the first pinhole 440 can be formed by opening the first light absorbing layer 451; on the other hand, the first absorbing layer 451 can absorb other light beams in the plurality of light beams except the light beam having the preset color, so as to reduce crosstalk of the light beams having other wavelengths and increase signal-noise ratio.

For example, in some examples, as illustrated in FIG. 5, each light splitting unit 410 further includes a second absorbing layer 452 disposed on the same layer as the first lens 430 and surrounding the first lens 430. The second absorbing layer 452 disposed on the same layer as the first lens 430 can block or absorb light beams incident on other regions other than the first lens 430 to enter between the first lens 430 and the first pinhole 440, thereby further reducing crosstalk of the light beams having other wavelengths and increasing signal-noise ratio.

In the light extraction device provided in the embodiments of the present disclosure, structural parameters of color separation gratings in different color separation units are different, and one color separation grating can be matched with one light beam with the preset color to realize the light beam with the preset color to be exited from a corresponding first pinhole. Then, according to the following grating equation: n1*sin θ1−n2*sin θ2=mλ/P, the structural parameters of each color separation grating in different color separation units can be determined, where n1 is a refractive index of a medium in which the incident light is located; n2 is a refractive index of a medium in which diffract light is located; θ1 is an incident angle; θ2 is a diffraction angle; m is a diffraction order (generally takes a value of +1 or −1); λ is a preset color (e.g., may be a wavelength of a light beam collimated and transmitted in a direction perpendicular to the color separation grating); P is a grating period. It should be noted that, the grating period determines the diffraction angle of light beams with different wavelengths, so the grating period is the key parameter. In addition, other structural parameters of the color separation grating, such as height, duty cycle, etc., can be obtained according to a desired diffraction efficiency.

Figure 6:
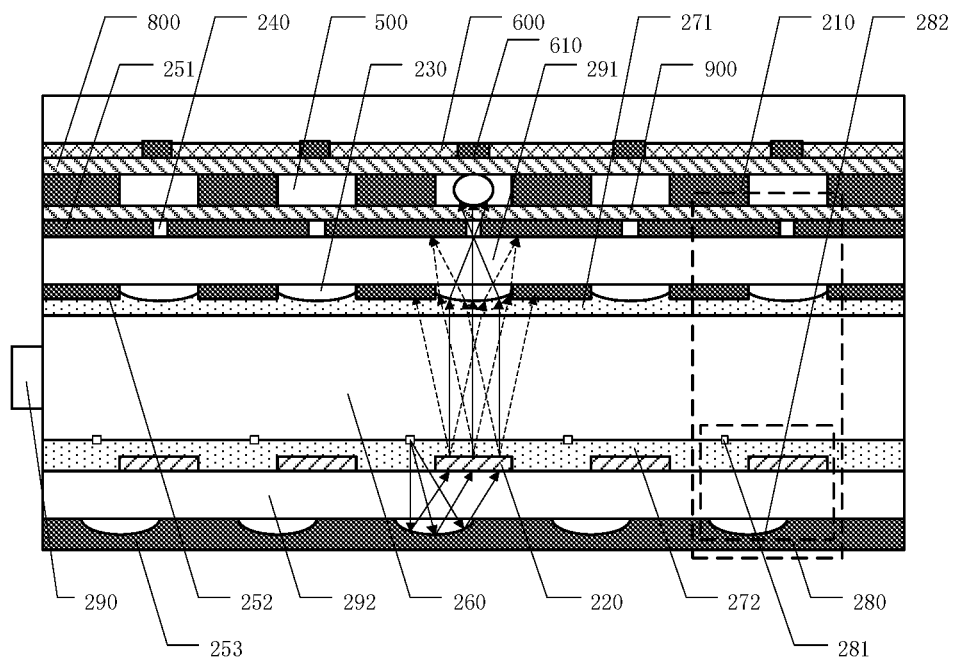
FIG. 6 is a structural view of a spectrum detection equipment provided by an embodiment of the present disclosure.
Figure 7:
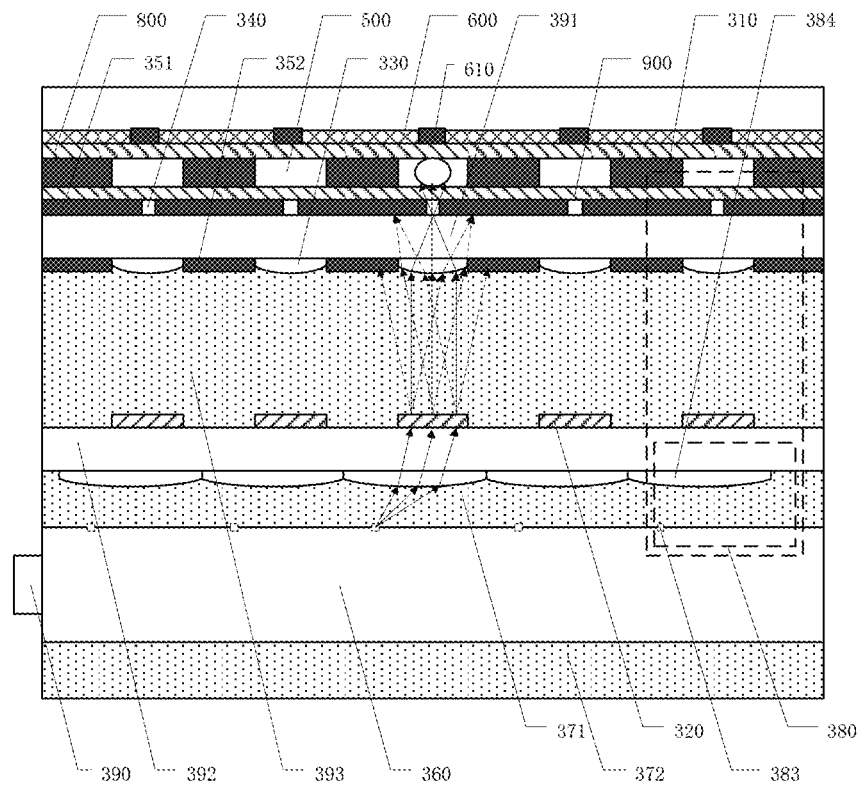
FIG. 7 is a structural view of another spectrum detection equipment provided by an embodiment of the present disclosure.
Figure 8:
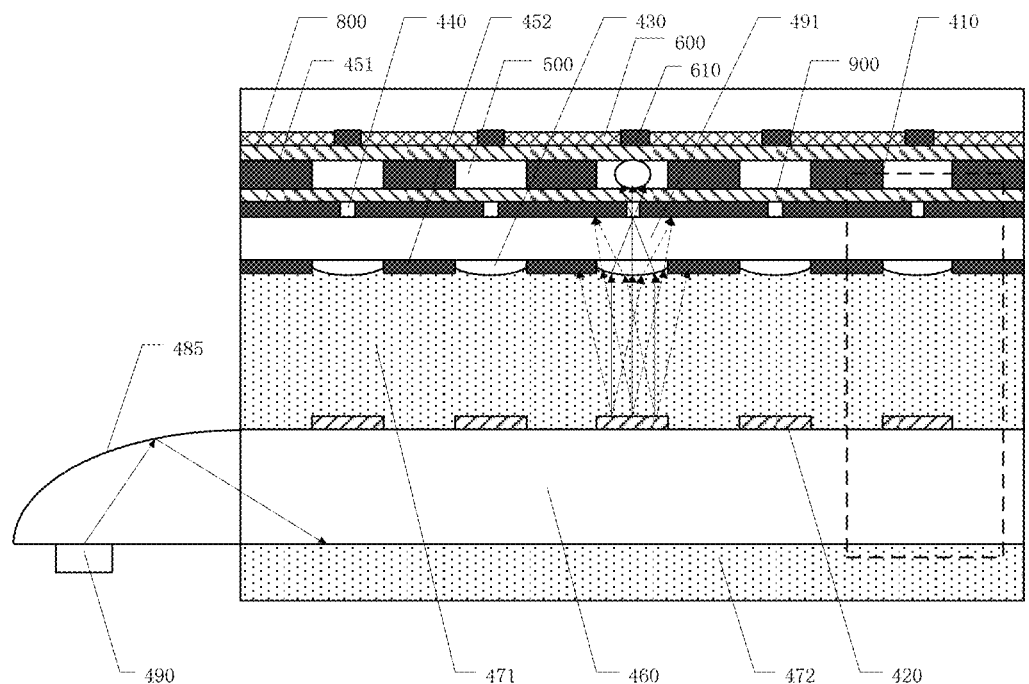
FIG. 8 is a structural view of another spectrum detection equipment provided by an embodiment of the present disclosure.

An embodiment of the present disclosure provides a detection equipment. FIG. 6-FIG. 8 are views of a detection equipment provided by an embodiment of the present disclosure. As illustrated in FIG. 6-FIG. 8, the detection equipment includes the light extraction device as mentioned above. Thus, because the light extraction device can accurately separate the multi-color light into a plurality of monochromatic lights and has higher signal-noise ratio, the detection accuracy of the detection equipment can be higher. Because the size of the light extraction device is small and convenient to carry, the application scene of the detection equipment can be widened. In addition, because the structure of the light extraction device is less difficult to manufacture and is convenient for industrialization, the detection equipment also has the effects of being convenient for industrialization and being beneficial for popularization and use.

For example, the detection equipment can be a microfluidic detection system, and can be applied to the fields of food classification, gene detection and so on.

For example, in some examples, as illustrated in FIG. 6-FIG. 8, the detection equipment further includes at least one microfluidic channel 500, disposed in one-to-one correspondence with the at least one light splitting unit. Each microfluidic channel is disposed on a side of the first pinhole away from the color separation grating in the light splitting unit which is correspondingly disposed. For example, as illustrated in FIG. 6, the microfluidic channels 500 are disposed in one-to-one correspondence with the light splitting units 210, and are located on a side of the first pinhole 240 away from the color separation grating 220 in the light splitting units 210; as illustrated in FIG. 7, the microfluidic channels 500 are disposed in one-to-one correspondence with the light splitting units 310, and are located on a side of the first pinhole 340 away from the color separation grating 320 in the light splitting units 310; as illustrated in FIG. 8, the microfluidic channels 500 are disposed in one-to-one correspondence with the light splitting units 410, and are located on a side of the first pinhole 440 away from the color separation grating 420 in the light splitting units 410. It should be noted that, an extension direction of the microfluidic channel 500 is a direction perpendicular to a paper surface in FIG. 6-FIG. 8.

For example, in some examples, as illustrated in FIG. 6-FIG. 8, the detection equipment further includes a photosensitive detection layer 600 disposed on a side of the microfluidic channel 500 away from the light extraction device 100, the photosensitive detection layer 600 includes photoelectric sensors 610 disposed in one-to-one correspondence with the light splitting units 110. The photoelectric sensor 610 can accurately align with the corresponding first pinhole and detect the light passing through the microfluidic channel 500. It should be noted that photoelectric sensor can detect changes in light intensity and illuminance of light and convert these light change information into electrical signals. For example, in some examples, as illustrated in FIG. 6-FIG. 8, the detection equipment further includes a first hydrophobic layer 800 and a second hydrophobic layer 900; the first hydrophobic layer 800 is located on a side of the microfluidic channel 500 close to the photosensitive layer 600; and the second hydrophobic layer 900 is located on a side of the microfluidic channel 500 close to the light extraction device, thereby facilitating the smooth flow of liquid in the microfluidic channel 500.

Figure 9:
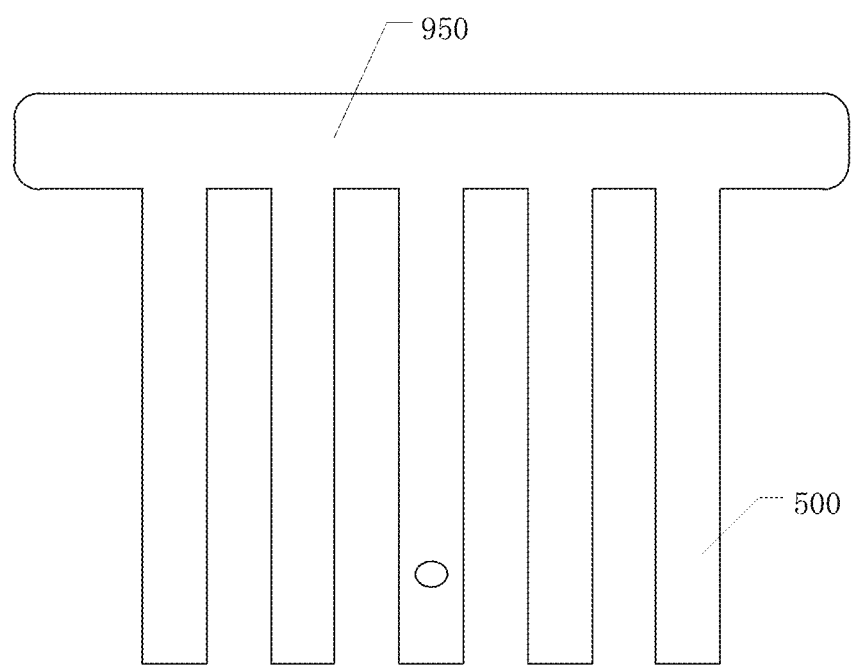
FIG. 9 is a plan view of a microfluidic channel in a spectrum detection equipment provided by an embodiment of the present disclosure.

FIG. 9 is a plan view of a microfluidic channel in a detection equipment provided by an embodiment of the present disclosure. As illustrated in FIG. 9, the detection equipment can further include a plurality of microfluidic channels 500, the plurality of microfluidic channels 500 are arranged at intervals, and each microfluidic channel 500 can be disposed corresponding to one light splitting unit. As illustrated in FIG. 9, the detection equipment further includes a waste liquid poor 950 connected with the microfluidic channel 500 to contain the liquid discarded after the reaction.

An embodiment of the present disclosure further provides an operation method of a detection equipment, the detection equipment includes the abovementioned detection equipment. The operation method includes: introducing a sample droplet into the at least one microfluidic channel; and driving the sample droplet to flow through the light splitting unit. For example, sample liquid can be driven to move by electrowetting or electric field. For example, when a sample droplet flows through a light splitting unit, light beams with the preset color are emitted from the light splitting unit and irradiated onto the sample droplet, and some components in the sample droplet react to the preset color, such as absorbing light, and whether the component are present in the sample droplet and the content of the component can be obtained by detecting the change of light after passing through the sample droplet.

For example, in the operation method of the detection equipment provided by an embodiment of the present disclosure, the detection equipment further includes: a photosensitive detection layer, disposed on a side of the microfluidic channel away from the light extraction device. The photosensitive detection layer includes at least one photoelectric sensor disposed in one-to-one correspondence with the at least one light splitting unit. The operation method includes: acquiring a light change information detected by the photoelectric sensor; and determining a component information of the sample droplet according to the light change information and a color of light emitted by the light splitting unit corresponding to the photoelectric sensor. For example, the light change information includes light intensity change information, illuminance change information, etc.

The following statements should be noted:

(1) The accompanying drawings involve only the structure(s) in connection with the embodiment(s) of the present disclosure, and other structure(s) can be referred to common design(s).

(2) In case of no conflict, features in the same embodiment or in different embodiments can be combined.

What have been described above are only specific implementations of the present disclosure, the protection scope of the present disclosure is not limited thereto. The protection scope of the present disclosure should be based on the protection scope of the claims.

What is claimed is:

1. A light extraction device, comprising at least one light splitting unit, each of the at least one light splitting unit comprising:

a color separation grating, configured to separate light incident on the color separation grating into a plurality of light beams that are collimated and propagated in different directions and have different colors;

a first lens, disposed corresponding to the color separation grating and configured to converge the plurality of light beams; and a first pinhole, located on a side of the first lens away from the color separation grating;

wherein the first lens is configured to converge a light beam having a preset color in the plurality of light beams to the first pinhole and allow the light beam having the preset color to exit, each of the at least one light splitting unit further comprises: a first absorbing layer, located on a side of the first lens away from the color separation grating and configured to absorb other light beams in the plurality of light beams except the light beam having the preset color, the first pinhole is located in the first absorbing layer, the light extraction device further comprises a light guide layer, a first filling layer and a second filling layer, the first filling layer is located on a surface of the light guide layer close to the first lens, the second filling layer is located on a surface of the light guide layer away from the first lens, the first filling layer is in direct contact with the first lens, each of the at least one light splitting unit further comprises a light guide structure, configured to guide the light totally reflected and transmitted in the light guide layer to the color separation grating, the light guide structure comprises: a first light extraction structure, located on a side of the light guide layer away from the first lens; and a reflective mirror, the color separation grating is located between the reflective mirror and the first lens, the first light extraction structure is configured to destroy a total reflection condition of the light guide layer to extract the light transmitted in the light guide layer, the first light extraction structure is located in a focal plane of the reflective mirror, and the reflective mirror is configured to convert light extracted from the first light extraction structure into parallel light and reflect the parallel light to the color separation grating, and an orthographic projection of the first light extraction structure on the light guide layer falls within an orthographic projection of the first absorbing layer on the light guide layer, and the orthographic projection of the first light extraction structure on the light guide layer is located at a first side of a main optical axis of the reflective mirror, an orthographic projection of the color separation grating on the light guide layer is located at a second side of the main optical axis of the reflective mirror, the second side is opposite to the first side.

2. The light extraction device according to claim 1, wherein, in each of the at least one light splitting unit, the first pinhole is located in a focal plane of the first lens.

3. The light extraction device according to claim 2, wherein, in each of the at least one light splitting unit, the first pinhole is located at a position where a focal point of the first lens is located.

4. The light extraction device according to claim 1, wherein, in each of the at least one light splitting unit, a center of the color separation grating and a center of the first pinhole are both located on a main optical axis of the first lens.

5. The light extraction device according to claim 1, wherein the first extraction structure comprises a second pinhole, the second pinhole has a diameter less than 500 µm.

6. The light extraction device according to claim 1, further comprises:

a free-form surface reflection layer, located in a surface of a side of the light guide layer, wherein the free-form surface reflection layer is configured to reflect light emitted from a light source located at a focal point of the free-form surface reflection layer and convert the light into parallel light, and couple the parallel light to the light guide layer, in each of the at least one light splitting unit, the color separation grating is located on a side of the light guide layer close to the first lens, and the color separation grating is configured to destroy the total reflection condition of the light guide layer to extract the light transmitted in the light guide layer.

7. The light extraction device according to claim 1, wherein the at least one light splitting unit comprises a plurality of light splitting units, the plurality of light splitting units are configured to respectively allow each of light beams having different colors in the plurality of light beams to be exited from a corresponding first pinhole, each of the plurality of light splitting units further comprises:

a second absorbing layer, disposed on the same layer as the first lens and surrounding the first lens.

8. A detection equipment, comprising:

the light extraction device according to claim 1; and
at least one microfluidic channel, disposed in one-to-one correspondence with the at least one light splitting unit, wherein each of the at least one microfluidic channel is disposed on a side of the first pinhole away from the color separation grating in the at least one light splitting unit which is correspondingly disposed.

9. The detection equipment according to claim 8, further comprises:

a photosensitive detection layer, disposed on a side of the at least one microfluidic channel away from the light extraction device, wherein the photosensitive detection layer comprises at least one photoelectric sensor disposed in one-to-one correspondence with the at least one light splitting unit.

10. The detection equipment according to claim 8, further comprises:
a waste liquid poor, connected with the at least one microfluidic channel.

11. An operation method of a detection equipment, wherein the detection equipment comprises: the light extraction device according to claim 1; and at least one microfluidic channel, disposed in one-to-one correspondence with the at least one light splitting unit, each of the at least one microfluidic channel is disposed on a side of the first pinhole away from the color separation grating in the at least one light splitting unit which is correspondingly disposed, the operation method comprises:
introducing a sample droplet into the at least one microfluidic channel; and
driving the sample droplet to flow through the at least one light splitting unit.

12. The operation method of the detection equipment according to claim 11, wherein the detection equipment further comprises: a photosensitive detection layer, disposed on a side of the at least one microfluidic channel away from the light extraction device, wherein the photosensitive detection layer comprises at least one photoelectric sensor disposed in one-to-one correspondence with the at least one light splitting unit, the operation method comprises:
acquiring a light change information detected by the photoelectric sensor; and
determining a component information of the sample droplet according to the light change information and a color of light emitted by the at least one light splitting unit corresponding to the at least one photoelectric sensor.

13. The light extraction device according to claim 1, wherein an orthographic projection of the first light extraction structure on the light guide layer and an orthographic projection of the color separation grating on the light guide layer are spaced apart,
the orthographic projection of the reflective mirror on the light guide layer is respectively overlapped with the orthographic projection of the first light extraction structure on the light guide layer and the orthographic projection of the color separation grating on the light guide layer.

* * * * *